United States Patent [19]

Foster

[11] Patent Number: 4,532,588
[45] Date of Patent: Jul. 30, 1985

[54] ELECTRONIC DOCUMENT DISTRIBUTION NETWORK WITH UNIFORM DATA STREAM

[75] Inventor: Gregory J. Foster, Austin, Tex.

[73] Assignee: International Business Machines Corporation, Armonk, N.Y.

[21] Appl. No.: 440,484

[22] Filed: Nov. 9, 1982

[51] Int. Cl.³ .................. G06F 15/16; G06F 15/20
[52] U.S. Cl. .................................................. 364/200
[58] Field of Search ... 364/200 MS File, 900 MS File; 370/88

[56] References Cited

U.S. PATENT DOCUMENTS

| | | | |
|---|---|---|---|
| 3,508,206 | 4/1970 | Norberg | 364/200 |
| 3,732,543 | 5/1973 | Rocher et al. | 370/88 |
| 3,753,234 | 8/1973 | Gilbert et al. | |
| 3,786,430 | 1/1974 | Hajdu et al. | 364/200 |
| 3,962,685 | 6/1976 | Bell Isle | 364/200 |
| 4,075,691 | 2/1978 | Davis et al. | 364/200 |
| 4,396,983 | 8/1983 | Segarra et al. | 364/200 |

OTHER PUBLICATIONS

"Electronic Information Interchange in an Office Environment," by M. R. DeSousa, *IBM Systems Journal*, vol. 20, No. 1, 1981, at p. 4.

"The Document Interchange Architecture: A Member of a Family of Architectures in the SNA Environment", by T. Schick et al., *IBM Systems Journal*, vol. 21, No. 2, 1982, at p. 220.

*Primary Examiner*—Harvey E. Springborn
*Attorney, Agent, or Firm*—J. B. Kraft

[57] ABSTRACT

An electronic document distribution network is provided having a uniform data stream which may be used by data processors of varying levels of data processing capability interconnected in the network. The network comprises a plurality of linked communicating data processors. Each of the processors has apparatus for receiving and for transmitting a uniform data stream which is representative of the content and format of the document as well as the processing to be performed with respect to the document. The network includes higher level processors which have a higher level of data processing capability with respect to the data stream and lower level processors. One or more of the lower level processors further include apparatus for scanning a received data stream and for selecting from the data stream parameters which this lower level processor is capable of processing. The lower level processor also has apparatus for storing the non-selective parameters which it is not capable of processing. After the lower level processor has processed the selected parameters, the processor includes apparatus for merging the selected parameters and the stored parameters into a reconstituted data stream which corresponds to the received data stream and apparatus for transmitting this reconstituted data stream to another processor in the network.

5 Claims, 4 Drawing Figures

ELECTRONIC DOCUMENT DISTRIBUTION NETWORK WITH UNIFORM DATA STREAM

TECHNICAL FIELD

This invention relates to electronic document distribution systems or networks and is particularly directed to the apparatus for handling a uniform data stream between various communicating processors participating in the network.

BACKGROUND ART

At the present time, one of the most rapidly expanding technologies in data processing is that of electronic document distribution to produce an automated office environment. This technology utilizes communication networks in an office-information-interchange system or electronic mail. Such a network is a complex interconnection of processing terminals or work stations of varying capabilities performing an assortment of data processing and text processing operations with respect to document production and distribution. A major problem that such networks present is the variety of interfaces and data forms which must be accommodated to functionally interconnect the various participating work stations and processors into an operational information-interchange system. In a conventional document distribution, not only must the various processing terminals be functionally interconnected but the system must provide the basic capability to enter and edit information, distribute information and print or display information. Irrespective of the network configuration, the system must be easy to use if it is to be effective. Also, the complexities of the various interface and data forms must be transparent to the users. In other words, the system must handle and distribute the documents with a minimum of operator intervention. To expect the sender of information to know very much about processor and data form requirements is unrealistic. The sender should be able to request that information be distributed. He should not have to be concerned about the expedients used in such a distribution.

To this end, the art has been developing uniform data streams which are discernible by the various processor-work stations participating in the document distribution network. Architectures have been defined which specify data stream content as well as the rules involved in the communication in the network. These data stream architectures specify the form of the information by describing the syntax and meaning of allowable elements in the data stream. Reference is made to the article entitled "Electronic Information Interchange in an Office Environment" by M. R. DeSousa, *IBM Systems Journal*, Vol. 20, No. 1, 1981 distributed Feb. 16, 1981, at page 4. This article describes a typical document distribution or interchange architecture which permits information to be carried from a sender to a recipient in such a network without requiring that both be interactively communicating during the distribution process. Further, it permits a sender to send information such as a document to multiple recipients with a single distribution request. Finally, the distribution architecture provides for services such as a security base storage during distribution and confirmation of delivery.

In data distribution networks, a uniform data stream may be considered to comprise two major components: the above described document interchange architecture which relates to communication and processing of the document and the document content architecture which is representative of the content and format of a particular document.

The document interchange architecture involved in the distribution and processing of documents in distribution networks is described in even greater detail in the article entitled "The Document Interchange Architecture: Member of a Family of Architectures in the SNA Environment", by T. Schick et al, *IBM Systems Journal*, Vol. 21, No. 2, 1982 distributed May 21, 1982, at page 220. Because of the wide variety of data processing equipment available in the current office environment together with the need to make document distribution network readily compatible with equipment which may be made available in the future, document distribution networks must have the capability of integrating into the system communicating processors of varying levels of data processing capabilities. Existing document distribution systems such as those described in the above mentioned articles provide for a uniform data stream whereby data processing stations or work stations with varying data processing capability may communicate with each other by following the protocol of the document interchange architecture. However, distribution systems problems arise when a document from a processor of higher capabilities is communicated to a processor or work station of lower or limited processing capabilities. This problem would be further complicated when it is necessary to further transmit the same document to a subsequent processor having greater or expanded data processing capabilities. This type of interchange may arise in many situations. For example, assume that a data stream containing relatively specific and sophisticated parameters with respect to document display is transmitted to a processor in the network which has very limited display capabilities and cannot process these specific parameters. After this receiving terminal has completed its processing requirements with respect to the document represented by the data stream, e.g., printing the document, it may become necessary for the data stream representative of the document to then be forwarded from this less sophisticated receiving processor to a more sophisticated processor which has the specific and complex display parameter processing capability. There is a need for the processor to have the ability of transmitting the original data stream intact to the final work station.

A similar need arises when a data stream representative of a document is to be transmitted to a less sophisticated processor station which performs some processing function and then onto the more sophisticated data processor. Here again there is a need to pass the data stream intact through the intermediate data processing station to the more sophisticated file station.

SUMMARY OF THE INVENTION

The present invention is directed to an electronic document distribution system having a network of communicating data processors and communication linkages between these processors. Each of the processors has means for receiving and means for transmitting a uniform data stream representative of the content and format of the document as well as the processing to be performed relative to that document. The network includes higher level processors having a higher level of data processing capability with respect to the data stream and one or more lower level processors which have lower level of data processing capability with respect to the same data stream. At least one of the lower level processors further includes means for scanning a received data stream in order to select from the data stream those parameters which this lower level processor is capable of processing as well as means for storing the non-selected parameters which the lower level processor cannot process so that after the lower level processor has completed the processing of the selected parameters, it may utilize means for merging the selected and the stored parameters into a reconstituted data stream corresponding to the original received data stream together with means for transmitting this reconstituted data stream to another processor, particularly a more sophisticated processor which is capable of processing parameters not selected and stored in the lower level processor.

BRIEF DESCRIPTION OF DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
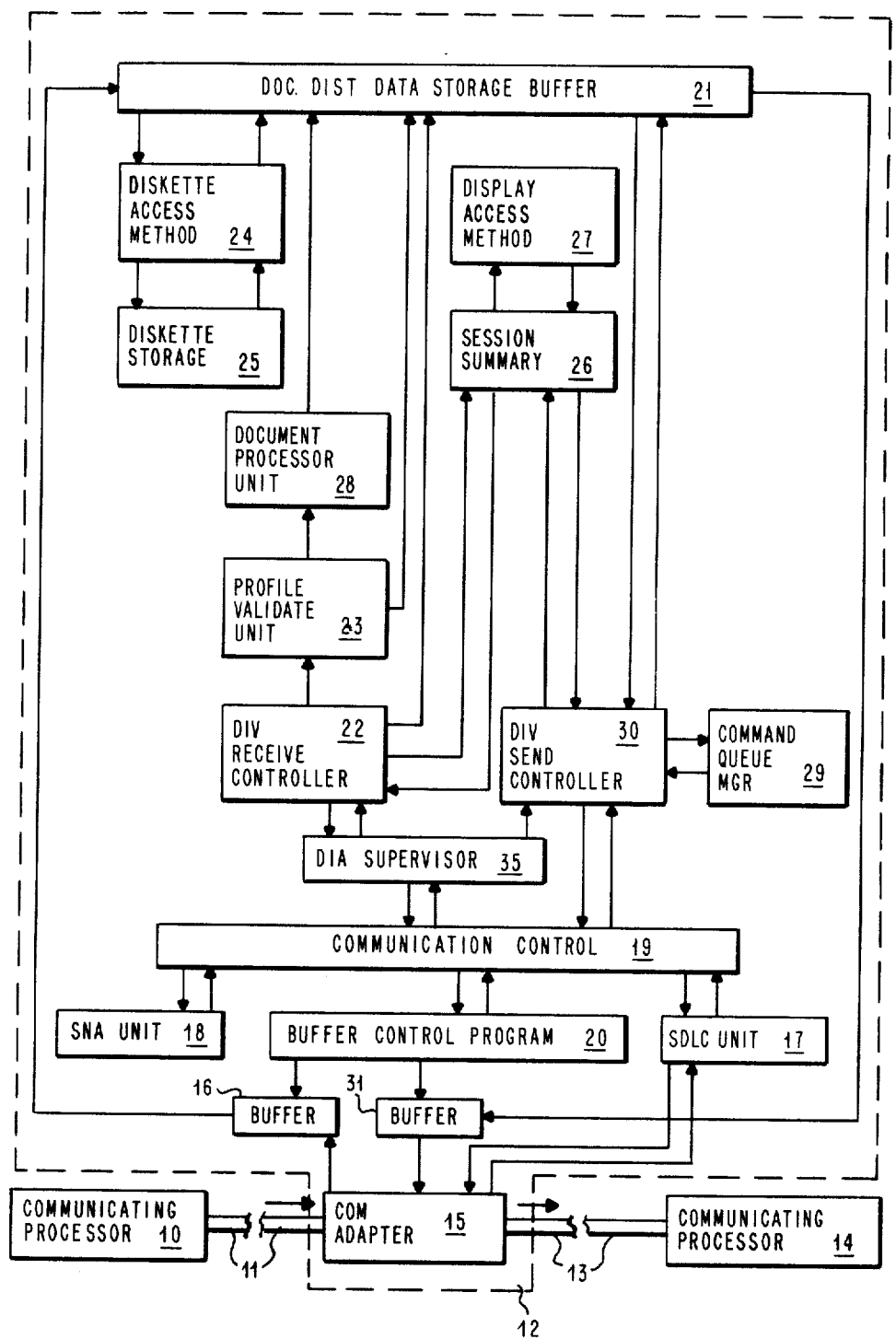
FIG. 1 is a logical block diagram showing apparatus which is used in the practice of the present invention.

With reference to the generalized apparatus of FIG. 1, the system of the present invention will be described. Let us assume that communicating processor 10 is the data processor having a relatively high level of data processing capability. This communicating processor will transmit over linkage 11 the data stream to communicating processor 12 which is a processor having a lower level of data capability with respect to the data stream than does communicating processor 10. Communicating processor 12 will selectively process the received data stream and subsequently transmit this received data stream intact to communicating processor 14 over linkage 13. Communicating processor 14 will for purposes of this illustration be a processor having a higher level of processing capability with respect to the data stream. Processors 10, 12 and 14 and communication linkages 13 and 11 are part of a document distribution network of the type described in the above mentioned M. R. DeSousa and T. Schick et al publications and particularly in the Schick et al publication. For purposes of the present embodiment, the illustrative communications network being here described will be considered to be a system in the Systems Network Architecture (SNA) environment described in the Schick et al publication. The present description will concern itself primarily with the functioning of communicating processor 12 which is a processor having relatively lower level of data processing capability than processors 10 and 14.

For purposes of this example, let us assume that initially, communicating processor 10 is transmitting or sending over linkage 11 a document to communicating processor 12. Communicating processor 12 is to have the contents of the document printed at a work station of which communicating processor 12 forms a part. The printing operation involved with respect to the contents of the document is not part of the present invention and will not be shown or described. The document to be printed under the control of processor 12 will be represented by a data stream communicated over linkage 11 to processor 12. In addition to the content of the document involved, the data stream will contain parameters related to processing operations which are within the capabilities of communicating processors 10 and 14 but beyond the capability of processor 12. Let us assume for example that these parameters relate to document length. In other words, some more sophisticated processors like processors 10 or 14 have a capability for utilizing information concerning document length in order to anticipate and plan for the number of pages which the document will require and consequently the number of lines on each particular page. Since the data stream to be transmitted throughout the document distribution network is preferably a uniform one, parameters related to document size are included in the data stream transmitted to processor 12 even though processor 12 has no capability with respect to any document sizing operations.

Since processing parameters such as those related to sizing of the document and the partitioning of the document by number of pages are processing parameters and do not relate to document content, they are customarily included in that portion of the data stream which relates to document distribution or document interchange architecture (DIA) rather than being treated as part of the document content unit in the data stream. The arrangement of a typical data stream illustrated by the data streams described in the above mentioned Schick et al article will be subsequently discussed in greater detail with respect to FIG. 4 of the Drawings which is based upon a figure appearing at page 225 of the Schick et al article.

Figure 3:
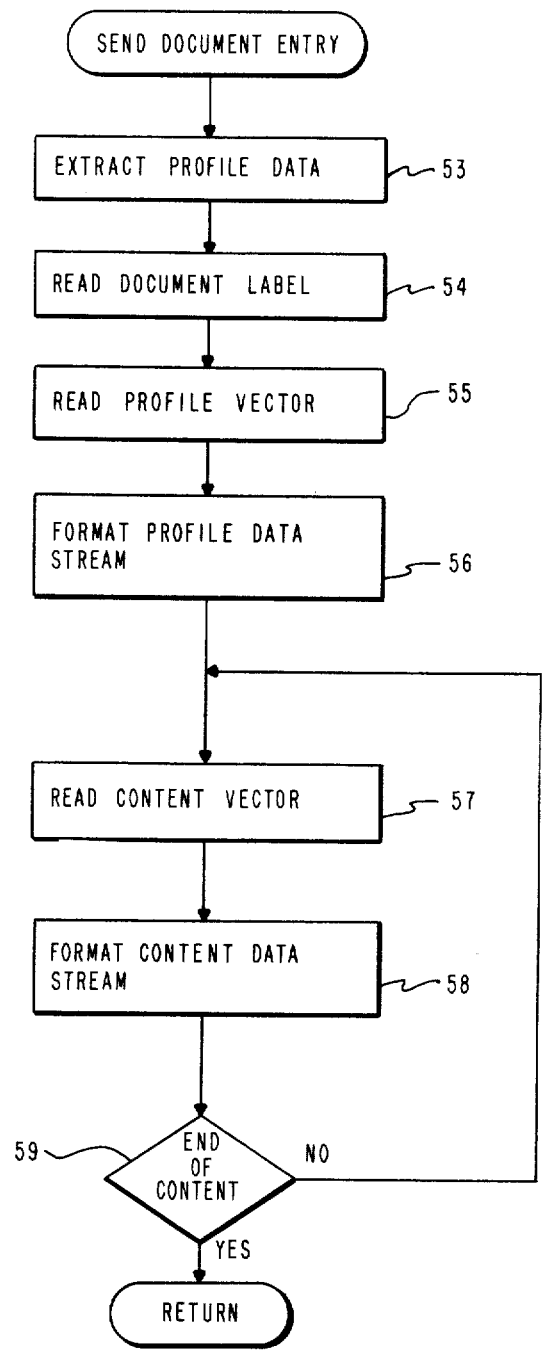
FIG. 3 is a flow chart of the operations involved in utilizing the apparatus of FIG. 1 to reconstitute and transmit or send the original received document data stream after processing has been completed.
Figure 4:
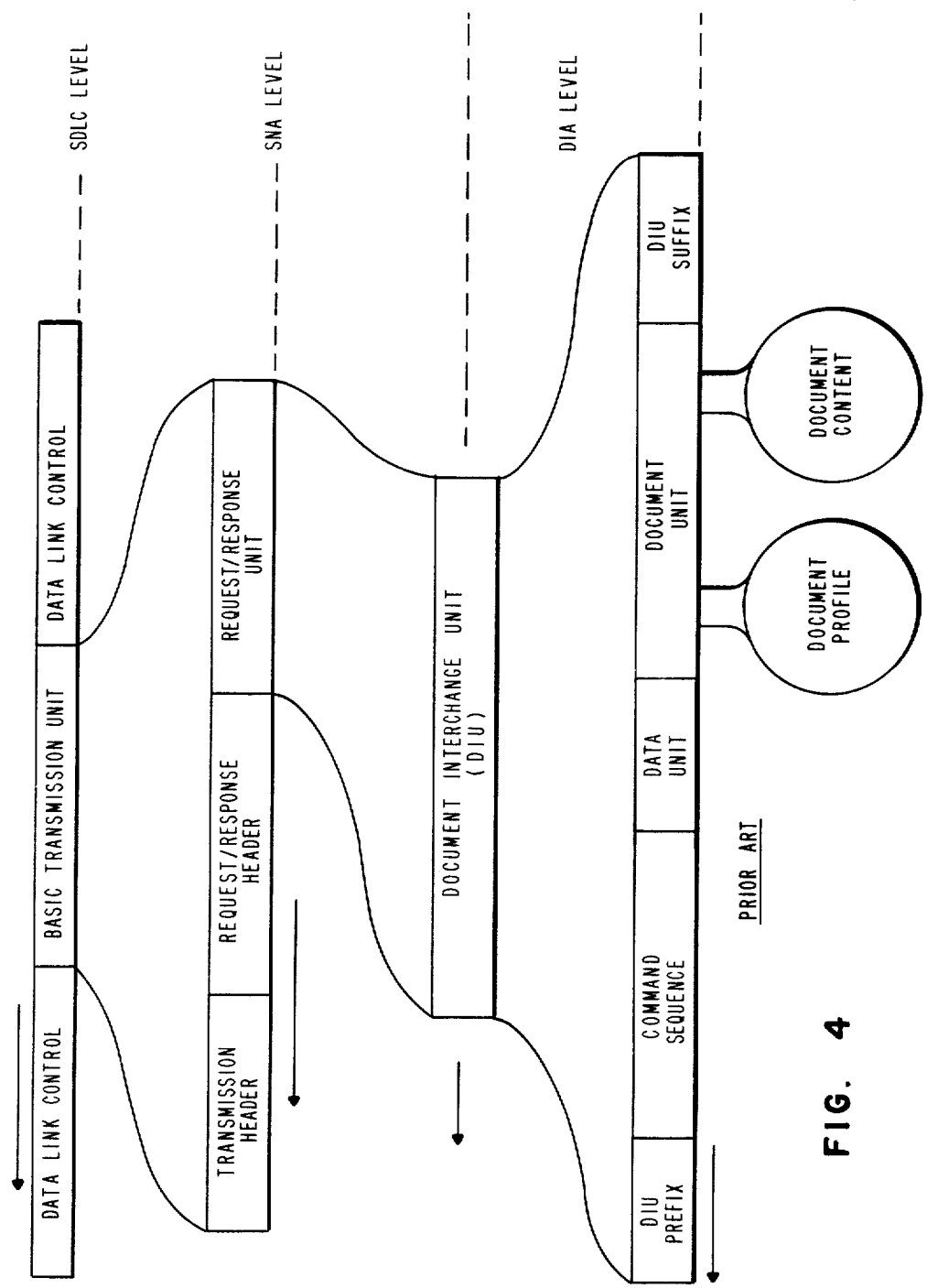
FIG. 4 is a prior art diagrammatic representation of a data stream with its units and sub-units broken down to the levels dealt with in the present invention.

In any event, a data stream like that shown in FIG. 4 is transmitted over linkage 11 and received by communications adapter 15 in processor 12. This communication adapter may be any standard device having the capability, at the receiving end for converting received serial data communicated over linkage 11 to parallel form so that it may be handled in processor 12 and if there is to be any subsequent transmission from processor 12 onto linkage 13 then for reconverting the parallel data being handled in processor 12 to a serial form so that it may be transmitted or sent over linkage 13. The data stream received through communications adapter 15 is stored in a receive buffer 16 while the synchronized data link control (SDLC) unit 17 determines that the data link control elements in the received data stream as shown in FIG. 4 at the SDLC level of the data stream are proper. If they are proper, then a determination is made as to whether the data stream meets systems network architecture requirements. This is done by the SNA unit 18 which determines whether the transmission header of the basic transmission unit (at the SNA level of FIG. 4) is correct. The activities of the SDLC unit 17 and the SNA unit 18 with respect to the received information in buffer 16 is synchronized by the communications control unit 19 through the buffer control program unit 20 which controls the buffer 16. If the data stream satisfies the requirements of the SDLC and the SNA unit, the buffer control program unit moves the data stream from buffer 16 to document distribution data storage buffer 21. Then, the operations of the present invention to be described with respect to the flow charts in FIGS. 2 and 3 will be carried out.

First, a determination is made by the document interchange architecture (DIA) supervisory unit 35 as to whether the basic document interchange unit (DIU) as shown in FIG. 4 is present in the data stream. This step is shown in decision block 40 in the received document data stream processing flow chart shown in FIG. 2 which will now be followed in considering the processing operations involved when a document is received within processor 12. If the basic DIU unit is not present, an error condition will be indicated. If the DIU is present, then a determination is made, decision block 41, as to whether the document profile unit is present in the data stream. This document profile unit shown in the illustration of the data stream in FIG. 4 is the basic unit in which various document processing and distribution parameters are contained. Here again, if document profile is not present, then an error condition will be signaled. On the other hand, if the document profile is present, then, block 42, the profile will then be scanned or examined under the control of DIU receive controller 22.

Figure 2:
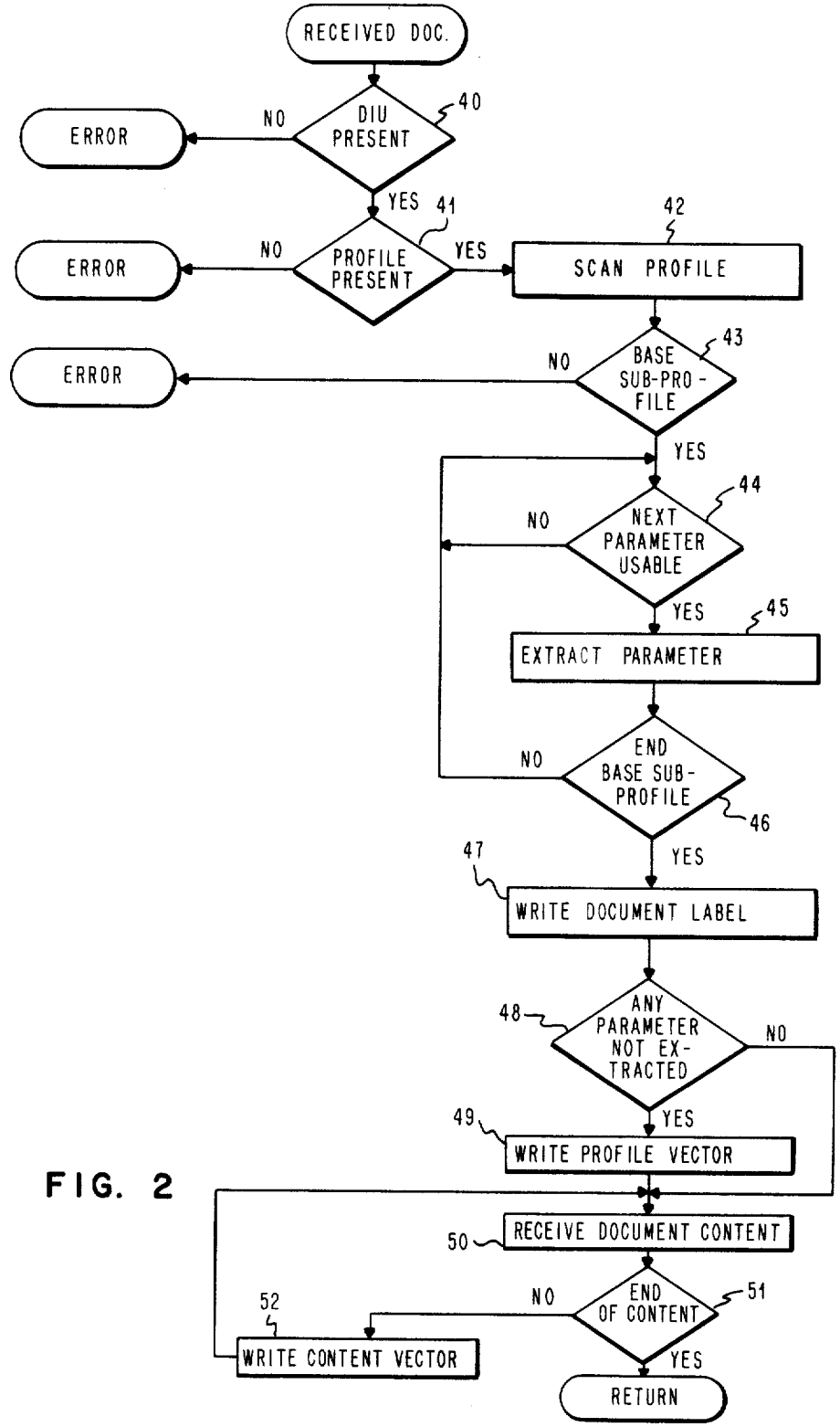
FIG. 2 is a flow chart showing the general steps involved in receiving and processing the data stream representative of a particular document by the apparatus of FIG. 1.

Next, decision block 43 in FIG. 2, a determination is made as to whether a base subprofile is present within the document profile. It is this base subprofile that contains both mandatory and optional processing parameters which are to be carried out with respect to the processing or interchange of the particular document. Of course, whether these parameters are carried out is dependent upon the processing capability of the particular processor then handling the document. The presence of the base profile is determined under the control of the DIU receive controller unit 22.

If this base subprofile is present, then the processor 12 enters an operation involving steps 44, 45 and 46 wherein all of the parameters in the base profile are examined in sequence and the determination is first made, step 44 as to whether next parameter in the sequence is useable, i.e., whether processor 12 is capable of using the information in the next parameter. If processor 12 is capable, then, step 46, the parameter is extracted from the data stream. If processor 12 is not capable of processing that parameter, then, the process is looped back to step 44 and the next parameter is examined for the same purpose. This procedure is repeated until a determination is made, step 46, that the end of the base profile has been reached. The whole sequence is carried out under the control of profile validation unit 23 shown in the logic of FIG. 1. Upon the completion of the examination of the base profile, a document label is written, step 47, i.e., all of the parameters which have been extracted from the base profile of the data stream as being utilizable are transferred from data storage buffer 21 to a diskette storage means 25 in processor 12 through a diskette access method. These stored parameters are now available for the subsequent processing to be carried out on processor 12 with respect to the actual document content. For example, if the parameters relate primarily to a printing operation which is to be carried out on a printer not shown associated with processor 12, when the document contents are subsequently received, parameters stored in the diskette storage means on the document label will be utilized by the processor 12 in controlling the printing operation. As previously indicated, the actual printing operation under the control of processor 12 is not considered to be part of the present invention and will not be described. However, if details are desired as to the operation of a typical text processing work station including a processor 12 to print a document, they are provided in co-pending application of D. G. Busch entitled "Data Communications System with Receiving Terminal for Varying the Portions of Received Data Being Displayed", Ser. No. 274,050, assigned to the assignee of the present invention and filed on June 16, 1981. While this co-pending application uses an asynchronous protocol for communication and the present invention uses synchronous protocol, the general operation of the terminal with respect to display and printing operations will be substantially the same. It should be noted that since communicating processor 12 is a display terminal processor, that if the display is to be utilized it may be accessed through the DIU receive controller 22 acting through session summary logic 26 and display access method 27.

Next, and still under the control of the profile validation unit 23, a determination is made as to whether there have been processing parameters in the base subprofile which have not been extracted, i.e., these would be processing parameters which had been previously passed over because processor 12 was incapable of carrying them out. If there are such processing parameters, then, step 49, a profile vector is written including these parameters. Here again and still under the control of the profile validation unit 23, the non-extracted parameters in the base profile previously examined are removed from the data stream that is stored in buffer 21 and then stored on a diskette 25 through diskette access method 24 as previously described. Thus, this write profile vector stored on a diskette in storage means 25 is representative of the parameters which the processor 12 was incapable of executing.

Upon the completion of the storage of non-extracted parameters if there are any, the operation proceeds to its next step 50 wherein a portion of the data stream representative of the document content is received in storage buffer 21 under the control of document processor unit 28. Then, in a process involving steps 51 and 52 of FIG. 2 under the control of document processor unit 28, document content vectors are written, i.e., that portion of the data stream representative of document content is transferred to diskette storage 25 via diskette access method 24 in substantially the same manner as previously described with respect to the transfer of processing parameters.

At this point, with the document content appropriately stored in diskette storage 25 and the processing parameters carried out with respect to the printing of the document, for example, under the control of processor 12 also stored in diskette storage 25 as a document label, the processor 12 is now ready to carry out such processing operations. While the processing operations are carried out by processor 12, the processing parameters which processor 12 is incapable of executing remain stored as the write profile vector in diskette storage 25.

At some stage in subsequent operation either immediately after the performance of the document processing such as printing by processor 12, it may be necessary for processor 12 to transmit the original data stream as received to another processor such as communicating processor 14. Processor 12 has the capability of reconstituting the data stream so that it is substantially identical to the data stream received from processor 10.

When the reconstituted data stream is to be transmitted to communicating processor 14, an appropriate command is inserted in command queue manager unit 29. In cases where the transmission upon completion of the processing in processor 12 is predetermined, the appropriate command may be preset in command queue manager 29. On the other hand, if there is a subsequent call for the document at some subsequent time after processing, the command may be inserted into command queue manager at the appropriate time either by communication through the network itself or by an operator keying in the request to the queue manager 29. At this point, the procedure set forth in the flow chart in FIG. 3 is as follows. First, step 53, command queue manager 29 activates DIU send controller unit 30 which will then control reconstitution of the base subprofile portion of the document interchange unit which was the portion previously separated into the document label and profile vector. At this point, step 54, document label is read out of storage in the diskette. This document label which contains the extracted parameters from the base profile which processor 12 has carried out is accessed from diskette storage means 25 through diskette access method 24 and stored in the appropriate sequence of the base profile being reconstructed as a portion of a data stream in data storage buffer 21.

Similarly, step 55, and still under the control of the DIU send controller 30, the profile vector which contained the non-extracted parameters, i.e., those which processor 12 was incapable of executing is also read out of diskette storage 25 through diskette access method 24 and stored in its appropriate sequence in the profile of the data stream being reconstituted in data storage buffer 21. The extracted and non-extracted parameters are thus reformatted into the profile of the data stream in data storage buffer 21, step 56. At this point, a sequence involving steps 57, 58 and 59 under the control of DIU send controller 30 is carried out which involves reading the document content vector from diskette storage 25 through diskette access method 24 to the data storage buffer 21 and inserting this document content vector as the document content portion of the data stream being reconstituted in buffer 21.

Then, under the control of the communication control unit 19, the data stream under the supervision of communication control unit 19 is moved into send buffer 31. Then, coordinated by the communications control unit 19, the SNA unit 18 determines whether or not the reconstituted data stream meets the network architecture requirements. This is carried out through buffer control program 20 which controls the send buffer 31. Next, in essentially the same manner as previously described with respect to the received information, SDLC unit 17 determines that the data link control elements in the data stream in send buffer 31 are proper. If the SDLC and SNA requirements are met in the reconstituted data stream in buffer 31, then, information in buffer 31 is transmitted through communication adapter 15 which makes the parallel serial conversion over linkage 13 to communicating processor 14.

Based upon the earlier assumption made in the present example, communicating processor 14 has a higher level of data processing capability than does processor 12 and particularly with respect to parameters dealing with document sizing and distribution of the document over a number of pages. Since the data stream being transmitted over link 13 from processor 12 is substantially the same as that originally transmitted to processor 12 over link 11, all of the parameters which processor 12 is incapable of handling have now been reconstituted into the data stream and are available to communicating processor 14 which has the capability for executing these parameters.

In example given above, we were dealing with communicating data processors of relatively higher and lower data processing capability. It should be noted that the present invention is also applicable to situations wherein there are a specific class or category of processors which participate in the distribution network which may not necessarily have a higher data processing capability but do have certain specific or private data processing procedures which they carry out with respect to the document which no other processors in the distribution network specifically follow. Such private or specific data processing parameters may also be included in the uniform data stream. In such a case, any data processor in the network not belonging to the specific class of processors will simply extract and ignore these private parameters. The particular processor receiving the data stream will store the parameters and then reconstitute them into the data stream so that they may be available as private parameters for any members of the particular class of processors requiring such parameters.

While the invention has been particularly shown and described with reference to a preferred embodiment it will be understood by those skilled in the art that various other changes in form and detail may be made without departing from the spirit and scope of the invention.

I claim:

1. In an electronic document distribution system having a network of communicating data processors and communication linkages between said processors, the improvement wherein each of the processors has means for receiving and means for transmitting a data stream representative of the content and format of a document and processing to be performed relative to said document, the network includes higher level processors having a higher level of data processing capability for the data in said data stream and at least one lower level processor having a lower level of data processing capability than said higher level processors for the data in said data stream, and said at least one lower level processor further includes means for selecting and processing a portion of a received data stream within the capability of said lower level processor, and means for transmitting unchanged all of the data in said received data stream irrespective of whether the data has been processed, whereby a single data stream may be used irrespective of the varying processing capabilities of the processors in the system.

2. In an electronic document distribution system having a network of communicating data processors and communication linkages between said processors, the improvement wherein each of the processors has means for receiving and means for transmitting a data stream representative of the content and format of a document, said data stream including parameters defining the processing to be done on data in said data stream and the transmission of said data stream, the network includes higher level processors having a higher level of data processing capability for the data in said data stream and at least one lower level processor having a lower level of data processing capability than said higher level processors for the data in said data stream, and said at least one lower level processor further includes means for scanning a received data stream and for selecting from the data stream parameters which said lower level processor is capable of processing, means for storing non-selected parameters which said lower level processor is not capable of processing, means for processing said selected parameters, means for merging said selected and stored parameters into a reconstituted data stream corresponding to the received data stream, and means for transmitting the data in said reconstituted data stream to said another processor in said network.

3. The electronic document distribution system of claim 2 wherein said lower level processor is a display word processor.

4. The electronic document distribution system of claim 2 wherein said processor to which said reconstituted data stream is transmitted is a display word processor, and said non-selected parameters relate to display capabilities.

5. The electronic document distribution system of claim 2 wherein a first of said higher level processors in said network transmits the data stream to said lower level processor and a second of said level processor receives the reconstituted data stream, said first and second higher level processors belong to a specific class of processors, and said non-selected parameters are included in a data processing capability limited to only said specific class of processors.

* * * * *

UNITED STATES PATENT AND TRADEMARK OFFICE
CERTIFICATE OF CORRECTION

PATENT NO. : 4,532,588
DATED : Jul. 30, 1985
INVENTOR(S) : Gregory J. Foster

It is certified that error appears in the above—identified patent and that said Letters Patent is hereby corrected as shown below:

Column 10, line 17, after "said" insert --higher--.

Signed and Sealed this

Third Day of February, 1987

*Attest:*

DONALD J. QUIGG

*Attesting Officer*  *Commissioner of Patents and Trademarks*